US008713118B2

(12) United States Patent
Katz et al.

(10) Patent No.: US 8,713,118 B2
(45) Date of Patent: *Apr. 29, 2014

(54) END TO END EMAIL MONITOR

(75) Inventors: Larry Katz, Reisterstown, MD (US);
Ramana Juvvadi, Hyderabad (IN);
David Bradford, Columbia, MD (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,850

(22) Filed: Jul. 13, 2012

(65) Prior Publication Data
US 2012/0284566 A1 Nov. 8, 2012

Related U.S. Application Data

(63) Continuation of application No. 11/505,593, filed on Aug. 17, 2006, now Pat. No. 8,224,903.

(51) Int. Cl.
*G06F 15/16* (2006.01)

(52) U.S. Cl.
USPC ............................ 709/206; 709/203; 709/207

(58) Field of Classification Search
USPC .......................................... 709/203, 206, 207
See application file for complete search history.

(56) References Cited

U.S. PATENT DOCUMENTS

| | | | |
|---|---|---|---|
| 5,781,857 A | 7/1998 | Hwang et al. | |
| 6,023,507 A | 2/2000 | Wookey | |
| 6,167,431 A | 12/2000 | Gillies et al. | |
| 6,557,036 B1 | 4/2003 | Kavacheri et al. | |
| 6,738,811 B1 | 5/2004 | Liang | |
| 6,823,479 B1 | 11/2004 | McElhaney, Jr. et al. | |
| 6,920,478 B2 | 7/2005 | Mendiola et al. | |
| 7,020,688 B2 | 3/2006 | Sykes, Jr. | |
| 7,032,023 B1 | 4/2006 | Barrett et al. | |
| 7,076,533 B1 | 7/2006 | Knox et al. | |

(Continued)

FOREIGN PATENT DOCUMENTS

| | | |
|---|---|---|
| EP | 1 139 221 | 10/2001 |
| WO | 00/62145 | 10/2000 |
| WO | 03/098515 | 11/2003 |
| WO | 2006/024300 | 3/2006 |

OTHER PUBLICATIONS

Baranof's Mailcheck 2.6 delivers Improved tools, PC Week Contents, Sep. 11, 1995, pp. 4, 83 & 97.

(Continued)

*Primary Examiner* — Yves Dalencourt
(74) *Attorney, Agent, or Firm* — Hanley, Flight and Zimmerman, LLC

(57) ABSTRACT

An example method to monitor an email system involves sending a test email to an email server. The email server is to automatically forward the test email to a plurality of email accounts of corresponding domains different from one another and different from the email system. When the test email does not arrive at the plurality of email accounts within a time period, a notification identifying the email server is generated. Other test emails are distinguished from the test email based on checksum values in subject fields of the test email and the other test emails. The other test emails correspond to different ones of a plurality of other email systems being tested for operability. Each checksum uniquely identifies a respective one of the test emails and a respective one of the email systems.

18 Claims, 13 Drawing Sheets

(56) References Cited

U.S. PATENT DOCUMENTS

| | | |
|---|---|---|
| 7,640,322 B2 | 12/2009 | Wendkos et al. |
| 8,224,903 B1 * | 7/2012 | Katz et al. .................... 709/206 |
| 2003/0110223 A1 | 6/2003 | Hamilton et al. |
| 2004/0059789 A1 | 3/2004 | Shum |
| 2004/0064511 A1 | 4/2004 | Abdel-Aziz et al. |
| 2004/0068543 A1 | 4/2004 | Seifert |
| 2004/0199592 A1 | 10/2004 | Gould et al. |
| 2005/0188028 A1 | 8/2005 | Brown, Jr. et al. |
| 2005/0223061 A1 | 10/2005 | Auerbach et al. |
| 2005/0262208 A1 | 11/2005 | Haviv et al. |
| 2006/0112166 A1 | 5/2006 | Pettigrew et al. |
| 2006/0129674 A1 | 6/2006 | Minegishi |
| 2006/0170705 A1 | 8/2006 | Wilson |
| 2007/0038714 A1 | 2/2007 | Sell |
| 2007/0233789 A1 | 10/2007 | Agarwal et al. |
| 2007/0233798 A1 | 10/2007 | Kelley et al. |

OTHER PUBLICATIONS

Beta-Test users mold E-mail monitor, ComputerWorld, Jul. 22, 1991, vol. XXV, p. 54.

* cited by examiner

COMSYS E-mail Health

Refresh

Recent Test History (48 Rows)

| Last Test Date | Status | Message Destination | Checksum | Services Received |
|---|---|---|---|---|
| 06-30-2006 15:57:40 | Pass | ms3aex0c:uslverify-e2e-sg01-db01@comsys.com | f98339631c45d93ca7801c16c67ed0f2 | S:1 |
| 06-30-2006 15:51:37 | Pass | ms3aex0c:uslverify-e2e-sg01-db02@comsys.com | f869689be25af2422d15b518af5d7014 | S:1 |
| 06-30-2006 15:53:45 | Pass | MS3AEX0C:uslverify-e2e-sg03-db02@comsys.com | 318d96713bf2ff7a04f6afae9eb1a0cb | S:1 |
| 06-30-2006 15:48:14 | Pass | ms3aex0c:uslverify-e2e-sg03-db01@comsys.com | f148ff5529bc9196699a246b9c78e704 | S:1 |
| 06-30-2006 15:46:13 | Pass | ms3aex0c:uslverify-e2e-sg02-db02@comsys.com | 835416b346256ff0ddd485cac80384e1 | S:1 |
| 06-30-2006 15:48:12 | Pass | ms3aex0c:uslverify-e2e-sg02-db01@comsys.com | ddfe0de06e029b52da60352a13caa83d | S:1 |
| 06-30-2006 15:33:44 | Pass | ms3aex0c:uslverify-e2e-sg03-db02@comsys.com | a1ed69a644ebe183a86804388fbd8e35 | S:1 |
| 06-30-2006 15:31:00 | Pass | ms3aex0c:uslverify-e2e-sg01-db02@comsys.com | 92a947f1ba65aa01aeb5bcc2c6c527ce | S:1 |
| 06-30-2006 15:28:30 | Pass | ms3aex0c:uslverify-e2e-sg01-db01@comsys.com | 0a6b5225d1f5ddcd10596156953db6384 | S:1 |
| 06-30-2006 15:26:53 | Pass | ms3aex0c:uslverify-e2e-sg03-db01@comsys.com | b611cc83a0e170f5c2cc0b14c96712d | S:1 |
| 06-30-2006 15:26:51 | Pass | ms3aex0c:uslverify-e2e-sg02-db02@comsys.com | 258ce9122a3bf568449dc06755559a5e3 | S:1 |
| 06-30-2006 15:26:50 | Pass | ms3aex0c:uslverify-e2e-sg02-db01@comsys.com | 3f6a612d6596d93339e73f472c8bcb424 | S:1 |
| 06-30-2006 15:06:01 | Pass | MS3AEX0C:uslverify-e2e-sg03-db02@comsys.com | d230281940007ea1efd9c3b26433aef3 | D:1 |

Fig. 4

CLIENT_EMAIL_HEALTH

Table to store the data of Email responses

| Column Name | Date Type | Nullable | Data Length |
|---|---|---|---|
| CLIENT_EMAIL_HEALTH_ID | NUMBER | N | 22 |
| RESPONSE_TIME | NUMBER | N | 22 |
| LAST_TEST_DATE | DATE | N | 7 |
| MESSAGE | VARCHAR2 | Y | 255 |
| CHECKSUM | VARCHAR2 | Y | 255 |
| SERVICES_RECIEVED | VARCHAR2 | Y | 255 |
| EMAIL_RECIEVED | NUMBER | Y | 22 |
| CS_ID | NUMBER | Y | 22 |

FIG. 5(a)

MAILMON_CLIENT_LIST

Table to store the data of active clients and email addresses and Email Alerts

| Column Name | Date Type | Nullable | Data Length |
|---|---|---|---|
| MAILMON_CLIENT_LIST_ID | NUMBER | N | 22 |
| CS_ID | NUMBER | N | 22 |
| EMAIL | VARCHAR2 | N | 255 |
| ACTIVE_FLAG | NUMBER | Y | 22 |
| SERVER | VARCHAR2 | N | 12 |
| ALERT_TO | VARCHAR2 | Y | 1024 |

FIG. 5(b)

COMSYS Email Alerting

Check the box to keep alerting enabled or uncheck to disable

☑ usiverify-e2e-sg02-db01@comsys.com (ms3aex0c)
☑ usiverify-e2e-sg02-db02@comsys.com (ms3aex0c)
☑ usiverify-e2e-sg03-db01@comsys.com (ms3aex0c)
☑ usiverify-e2e-sg01-db01@comsys.com (ms3aex0c)
☑ usiverify-e2e-sg01-db01@comsys.com (ms3aex0c)
☑ usiverify-e2e-sg03-db02@comsys.com (ms3aex0c)

Submit Query

FIG. 7(a)

COMSYS Email Alerting

Check the box to keep alerting enabled or uncheck to disable

☐ ☐ ☐ ☐ ☐ ☐ usiverify-e2e-sg02-db01@comsys.com (ms3aex0c)

usiverify-e2e-sg02-db02@comsys.com (ms3aex0c)

usiverify-e2e-sg03-db01@comsys.com (ms3aex0c)

usiverify-e2e-sg01-db02@comsys.com (ms3aex0c)

usiverify-e2e-sg01-db01@comsys.com (ms3aex0c)

usiverify-e2e-sg03-db02@comsys.com (ms3aex0c)

Submit Query

FIG. 7(b)

COMSYS Email Alerting

Check the box to keep alerting enabled or uncheck to disable usiverify-e2e-sg02-db01@comsys.com (ms3aex0c)

usiverify-e2e-sg02-db02@comsys.com (ms3aex0c)

usiverify-e2e-sg03-db01@comsys.com (ms3aex0c)

usiverify-e2e-sg01-db02@comsys.com (ms3aex0c)

usiverify-e2e-sg01-db01@comsys.com (ms3aex0c)

usiverify-e2e-sg03-db02@comsys.com (ms3aex0c)

Submit Query

FIG. 8(a)

| Severity | Failures |
|---|---|
| Warning | Failed Once |
| Critical | Failed two times consecutively |
| Fatal | Failed three times consecutively (Sev 12) |

END TO END EMAIL MONITOR

PRIORITY APPLICATION

This is a continuation of U.S. patent application Ser. No. 11/505,593, filed Aug. 17, 2006, which is hereby incorporated herein by reference in its entirety.

FIELD OF THE INVENTION

The invention is related generally to electronic mail (email) messages, and more specifically to an architecture, methods, and systems for monitoring and verifying the ability to send and receive email messages to and from local and remote networks, including for example via the Internet.

BACKGROUND

In one prior art approach, a separate system is installed on the customer's internal network to do testing of email messages. This approach is limited in that it only tests internal email flow and does not test email sent to and from Internet locations. Boxtone®, IPsentry®, and Microsoft® MOM are examples of products that test emails internal to a system. Using this type of testing system requires that the software package be brought into the customer network and be installed in a real, live production environment. Moreover, this approach does not scale economically across multiple customer installations.

Another known email testing methodology uses an external system to test that the inbound mail port, for example port 25, is accessible. This approach does not test that email has actually arrived inbound, nor that email can be sent outbound. Systrack® is an example of a product that implements this type of approach. Products such as Systrack® only test to verify that some software agent is responding on port 25 and do not verify that email is successfully received from an Internet source.

Another approach tests that email at an inbound mail port has arrived inbound via Pop3 access. This approach also does not test that an email can be sent outbound. Nimsoft® and Alertsite® are product examples that implement this method. This type of testing requires that the Pop3 protocol must be enabled on the Microsoft® Exchange server and opened on firewalls for Internet access, thus exposing the internal system to outside threats. This is not desired in a typical corporate environment.

SUMMARY

An end to end email monitor according to the principles of the disclosure monitors the ability of the system to send and receive email messages to and from local and remote networks including for example the Internet. That is, an email monitor according to an aspect of the disclosure tests email sent both to and from Internet locations and verifies that email has actually arrived inbound and can be sent outbound to Internet destinations. The full-featured nature of the disclosure, whereby inbound email flow, internal email services, database availability, and outbound email flow are tested, enhances marketability of the disclosure.

In yet another aspect of the disclosure, the use of checksums in the subject for precise identification allows emails from multiple client environments to arrive in a single, shared Internet test account. Consequently, a monitor has to access only this single account to verify email receipt for all client environments, thereby reducing the network load required to access every test email. In still another aspect of the disclosure, the use of multiple targets for email verification eliminates false positives due to a single email destination being unavailable.

A further feature of the email monitor is that SNMP alerting is used in addition to email alerting to provide an out of band notification method that is unavailable in many current products. The SNMP alerting has been further enhanced to send the identification of the tested email server as the source, instead of the identity of the central server performing the tests. Moreover, the email monitor in accordance with the disclosure stores historical information for 45 days and can produce detailed reports, or service level agreement reports summarizing outage events and delay occurrences in addition to providing real-time alerts.

BRIEF DESCRIPTION OF THE DRAWINGS

In the drawings:

FIG. 4 illustrates an exemplary summary page of email messages sent in accordance with the present disclosure;

FIG. 5 illustrates exemplary databases for use in accordance with the principles of the present disclosure;

FIGS. 7(a) and 7(b) illustrate an exemplary alert page for enabling and disabling alert notification in accordance with the principles of the present disclosure;

FIGS. 8(a) and 8(b) illustrate an exemplary alert setup page in accordance with the principles of the present disclosure;

DETAILED DESCRIPTION

I. Overview

In general, a system and corresponding methodology according to the principles of the disclosure tests inbound email flow, internal email services, database availability, and outbound email flow by monitoring the ability of the system to send and receive email messages to and from local and remote networks including for example via the Internet.

Figure 1:
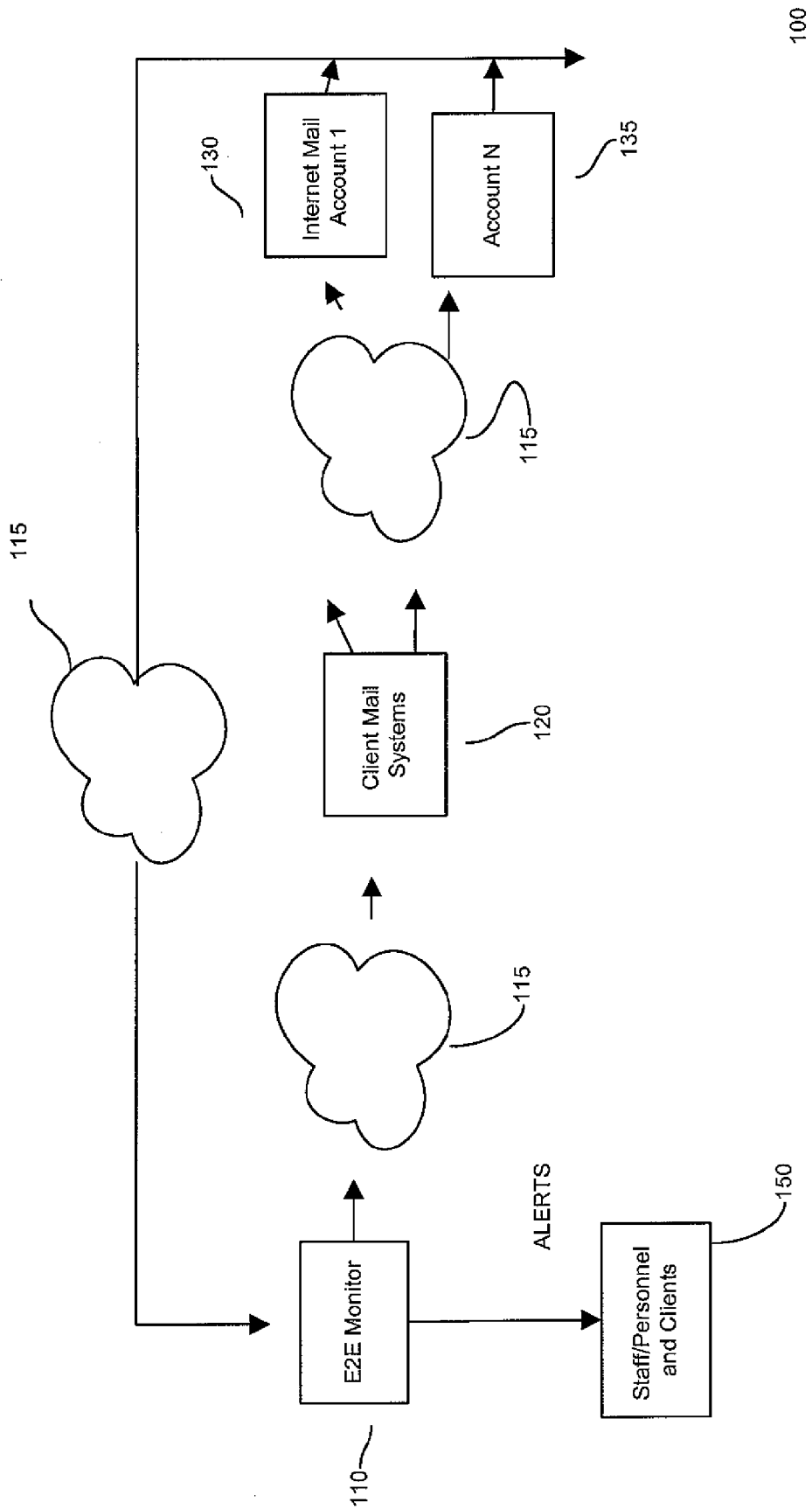
FIG. 1 illustrates a top level exemplary end to end email monitoring architecture and system according to the principles of the disclosure.

Referring to FIG. 1, there is shown a top level architecture for monitoring and verifying the email health of a client mail system in accordance with the principles of the disclosure. A system 100 has a monitor 110 connected to a client mail system 120 via a network 115, such as the Internet. Client mail system 120 is further connected to email accounts 1 to N, designated 130 to 135, respectively, via network 115 or some other similar network. Monitor 110 is also connected to email accounts 130 to 135 via network 115 or some other network. Monitor 110 is further connected to personnel 150 via network 115 or some other network. Personnel 150 can include multiple end-users, for example, monitoring staff and clients. Although the term "connect or connected to" is used in this description, it is meant to include any type of communications or communication media between the various components.

Figure 2:
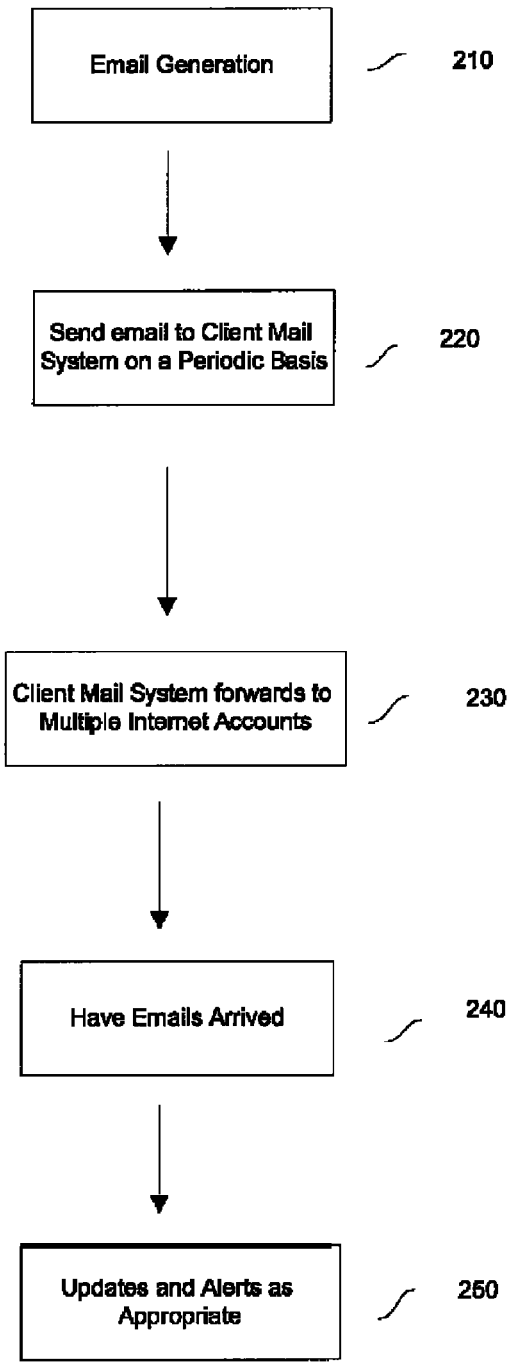
FIG. 2 is an exemplary top level flowchart according to the principles of the disclosure.

Referring now to flowchart 200 in FIG. 2 and also to FIG. 1, in step 210, monitor 110 generates an email message that has a time stamp and a unique checksum or indicia in the subject line to ensure the email message can be precisely identified when it is received. In step 220, the email messages are sent to dedicated mailboxes on each database in client mail system 120 via network 115. This can be done on a periodic basis, for example, every 15 minutes. Next, in step 230, each dedicated mailbox in client mail system 120 forwards each message to multiple email accounts 130-135 on network 115, such as the Internet. Monitor 110 detects whether the email message arrived in step 240. In step 250, monitor 110 updates an email health web page for each client, and alerts are sent via SNMP to staff personnel in, for example, a Network Operation Center, and via SMTP to any clients if there is a failure (depicted in FIG. 1 as 150).

II. Example Embodiment

For purposes of clarity, a system and subsystems approach will be used to describe a more detailed exemplary implementation system for the architecture and functions shown in FIG. 1 and FIG. 2. The initial discussion will include a basic description of the example system. This will be followed by discussions on particular subsystems such as the monitor, mailbox creation, client webpage, interface controls, and alert setup and processing. Finally, an example method using the detailed example system will be presented in accordance with the principles of the disclosure.

a. Example System

Figure 3:
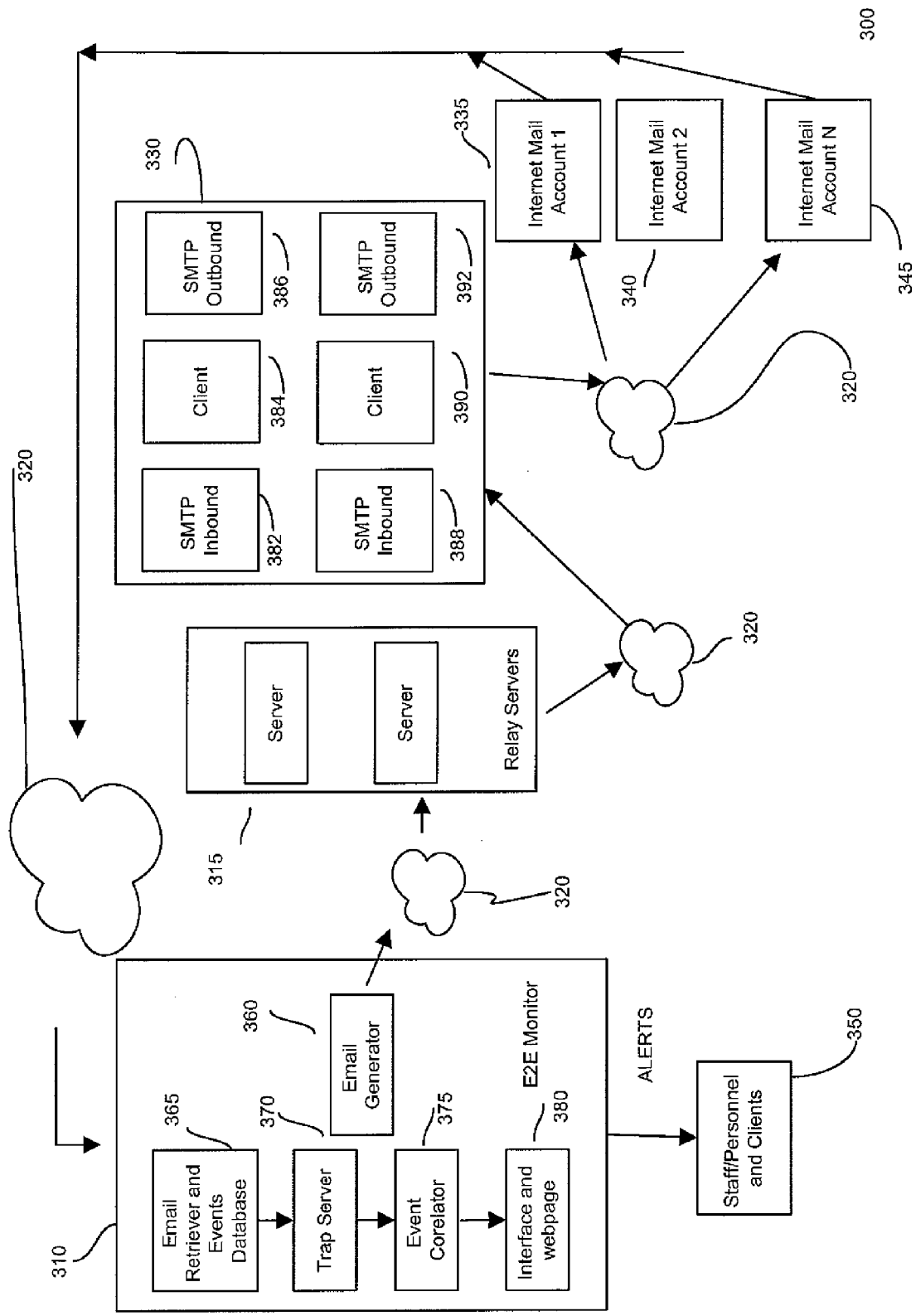
FIG. 3 illustrates a more detailed exemplary end to end email monitoring system according to the principles of the disclosure.

Referring now to FIG. 3, there is shown an example end to end email monitoring system 300 for monitoring and verifying email health in accordance with the principles of the disclosure. System 300 has a monitor 310 which is connected to a client email system 330 via a network 320, such as the Internet. Relay servers 315 may be situated in between monitor 310 and client email system 330. Client email system 330 is further connected to email accounts 1 to N, designated 335 through 345, respectively, via network 320 or some other similar network. Monitor 310 is also connected to email accounts 335 through 345 via network 320 or some other network. Monitor 310 is further connected to personnel/staff and clients 350 using alerts sent via network 320.

Monitor 310 is the processing core for the end to end email monitoring system 300. It includes an email generator 360 for generating emails with the naming conventions discussed below, and an email retriever and events database 365 for determining if emails have arrived at the designated external email addresses and for initiating alert processing in case of system failure. Email retriever and events database 365 sends alerts to a trap server 370 for collecting event results. An event correlator 375 processes information from trap server 370, sends updated information to webpage 380 and sends alerts to monitoring personnel and clients 350 as required.

As discussed above, monitor 310 includes a webpage 380 for each client to present email monitoring information as shown in FIG. 4. Webpage 380 shows the last test date, status, response time, message destination, checksum and services received. The information is captured in databases as shown in FIGS. 5(a) and 5(b).

b. Mailbox Creation and Email Naming Convention

Referring now to client email system 330, mail boxes are created on each database on every mail server in use by a client. For example in FIG. 3, 382 through 386 and 388 through 392 represent internal email flow through multiple databases for a specific client and more importantly, client email system 330 can include any number of components, such as client databases and servers, without added expense or external equipment for operation of the present disclosure. For this example embodiment, the use of the Microsoft® Exchange server is used, but any mail solution, such as Groupwise® or Lotus® can also be used.

For ease of administration and efficiency, the monitoring system of the disclosure uses the following convention to name client email mail boxes, although any other similar construct can also be used. If for purposes of illustration a client's Exchange server has 2 storage groups with 2 databases on each storage group, then four mail boxes should be created in such a way that each mail box resides on a different database or, stating it another way, the mail boxes should be created to correspond to the four separate databases. If a mailbox is created on the $1^{st}$ database of the $1^{st}$ storage group, it should be named as usiverify-e2e-sg01-db01@clientname.tld and similarly a mailbox on the $2^{nd}$ database of the $2^{nd}$ Storage group should be named as usiverify-e2e-sg01-db02@clientname.tld.

For the external or Internet email addresses the following naming convention is used in the monitoring system, although any other similar construct can also be used. The Internet email address will comprise an end to end monitoring system identifier such as e2e and a client identifier such as an alphanumeric code. For example, a number may be associated with each client such as 401 for client x and 666 for client y.

The monitoring system of the invention uses multiple Internet sites or targets for email verification to eliminate or minimize false positives due to a single email destination being unavailable. The Internet email accounts could be at any of a number of sites including for example, Gmail®, Care2®, spam.la, dodgeit and Lycos®. Establishment of these external email accounts is done in accordance with the specific site's policies. As each new client is added, accounts are setup on these external email account provider sites. If as an example, an email account was setup at Gmail® and care2®, then using the above naming convention, the target email account names for client x would be "e2e-401@gmail.com" and "e2e-401@care2.com" and for client y it would be "e2e-666@gmail.com" and "e2e-666@care2.com".

Once all the internal mailboxes and external email accounts are created, an auto-forward is enabled on each of these local client internal mailboxes to send to a distribution list ("DL"). This newly created DL could be named as DL-USiverify. The members of this DL are the external email account addresses discussed above. The DL could include any number of external email addresses and in the exemplary embodiment, the DL consists of the following 5 external email account addresses:

Spam.la, dodgeit.com, gmail.com, care2.com, and Lycos.com

Hence, the members of the DL would be as follows for client x using the above naming conventions:

e2e-401@spam.la
e2e-401@dodgeit.com
e2e-401@gmail.com e2e-401@care2.com
e2e-401@lycos.com For any clients who use an external spam/virus filtering service, a request may need to be sent to request that the client's spam/virus filtering solution allow test email to pass from the USi mail server, i.e., mailmon@usi.net, to the test addresses described above.

As stated above, email generator 360 inserts into the subject of the test emails a specific checksum which provides precise identification and allows emails from multiple client environments to arrive in a single, shared Internet test account. In other words, each checksum uniquely identifies a specific test email message sent for a specific client mail component. In addition, email retriever and events database 365 can compare a successfully retrieved test email against all the emails stored in monitor 310 and determine the client name and component that was being tested. The combination of the naming convention and the checksum requires monitor 310 and specifically email retriever and event database 365 to access a single account to verify email receipt for all client environments, thereby reducing the network load required to access every test email and the number of external email accounts.

c. Interface Control Implementation

Figure 6:
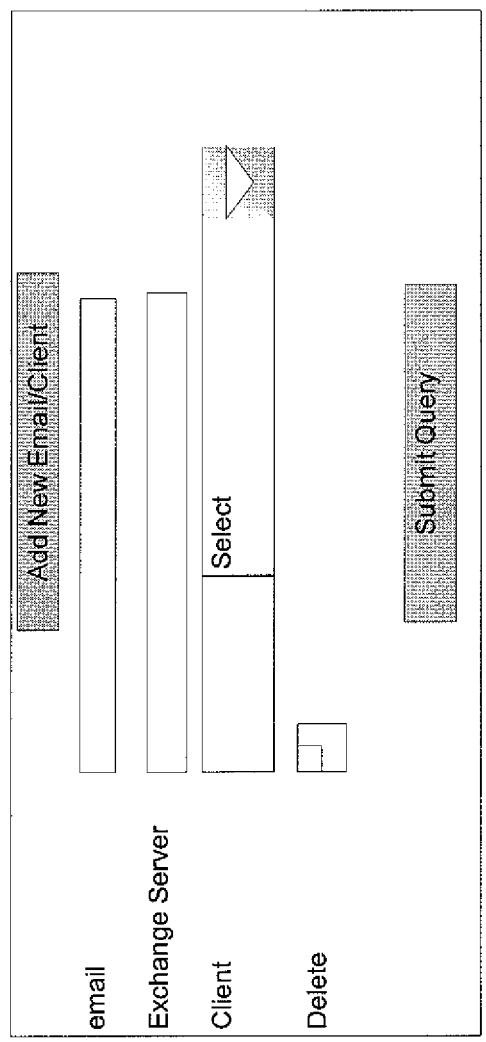
FIG. 6 illustrates an exemplary control panel page in accordance with the principles of the present disclosure.

With reference to FIG. 6, monitor 310 further includes an interface control panel for adding clients, adding email addresses to test and enabling and disabling alerting. For example, via the interface control panel, adding a new client to the list to be verified, or adding a new test email address to an existing list, can be done by entering the new email address, naming the Exchange server, choosing the client from the drop down box, and pressing the submit button. To remove an existing client from the list, the unwanted email address is entered into the email text box, the Delete checkbox is checked and the submit button is pressed. This removes the email address from the alerting list. Repeating the same thing for all of the email addresses of a client will remove the client from the list.

Referring now to the alert enable/disable forms shown in FIGS. 7(a) and 7(b), the interface control panel can also be used to control alert notification. Due to various reasons, such as a planned change in progress, monitoring staff 350 may want to enable or disable the alerting temporarily without permanently removing the client from the e2e monitor alerting list. As shown in FIG. 7(a), the page is populated with the email addresses grouped by client names, along with an indicator of whether or not alerting is enabled on that address. The table shows that the boxes corresponding to the client's four email addresses are checked, indicating that all of the client's email addresses are enabled for e2e health check alerts.

Referring now to FIG. 7(b), if alerting needs to be temporarily disabled, then the boxes should be unchecked and the form submitted. As shown, alerting is disabled until they are checked again and submitted.

d. Alert Setup and Processing

In the event that the e2e monitoring system detects an issue, it is desirable to send staff personnel and clients notification alerts about the problem. Accordingly, the e2e monitoring system has the ability to send emails to staff personnel and clients when a client email system is encountering issues. In some instances, clients may not be able to receive certain email alerts since the email alerts may travel through the same path for the client that is experiencing problems. In accordance with the principles of the disclosure, monitor 410 uses SNMP alerting in addition to email alerting to provide an out of band notification method that is unavailable in current products.

The SNMP alerting has been further enhanced to send the identification of the tested email server as the source, instead of the identity of the central server performing the tests. In addition, monitor 410 stores historical information for 45 days and can produce detailed reports, or service level agreement reports summarizing outage events and delay occurrences in addition to providing real-time alerts.

Figure 8B:
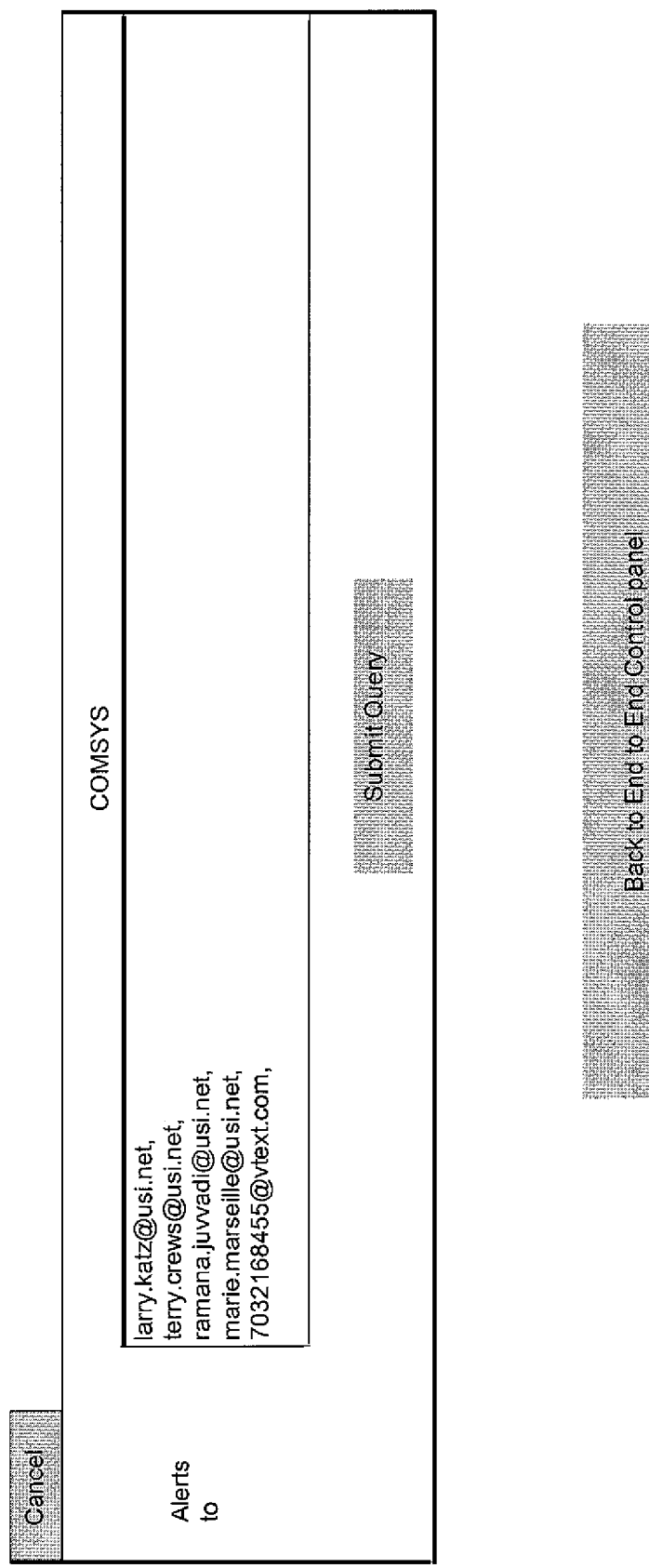

Referring now to FIG. 8(a), a page from the interface control panel is shown which has a link to go to the email alerting page for personnel and staff. By clicking on the "Email Alerting" link on the page, a list of all the email addresses for the personnel and staff are listed as shown in FIG. 8(b). Email addresses can be added to the existing list by appending to the list. To remove email addresses from the existing list, select and delete the pertinent email address or addresses and click the submit button. The email address(es) will be deleted from the database.

As discussed below, email alerts are sent to staff personnel and clients only when a particular email address of a client fails to receive test emails for a predetermined number of times, for example, three consecutive times. Even though the alert is sent only when the email address fails three times, the monitoring center is alerted via an event correlator, such as Netcool®, as a warning on the very first failure.

e. Alerting

Figures 9, 11:
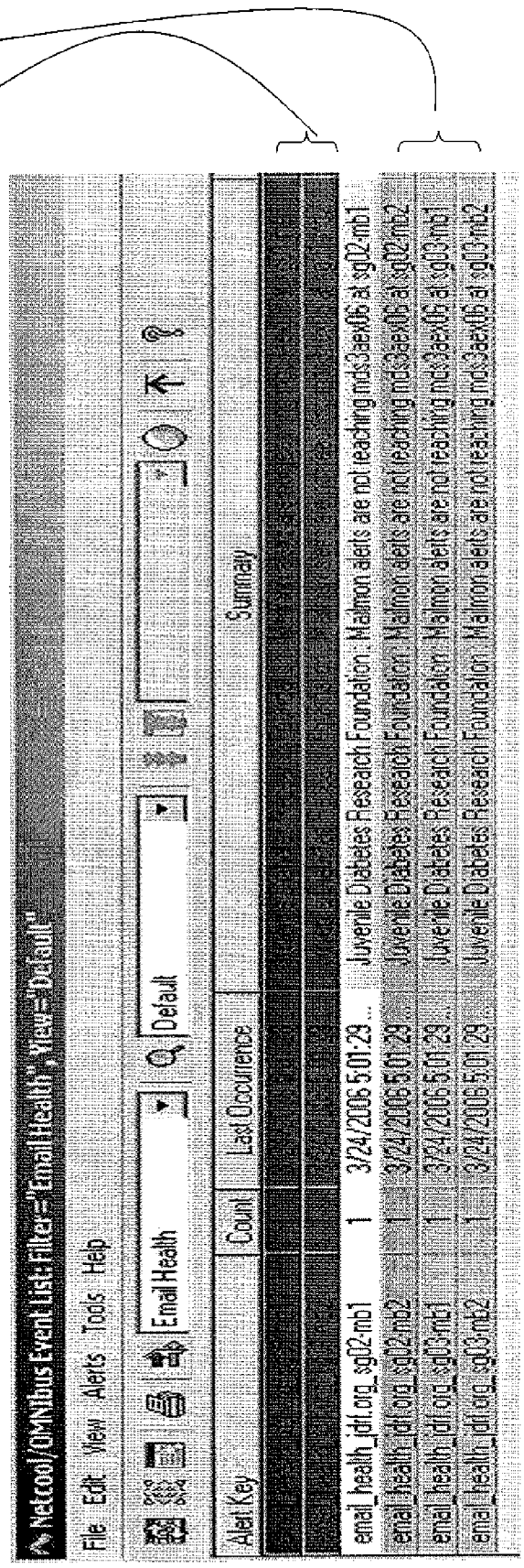
FIG. 9 depicts an alert severity table in accordance with the principles of the present disclosure.
FIG. 11 depicts exemplary email alerting in accordance with the principles of the present disclosure.
Figure 10:
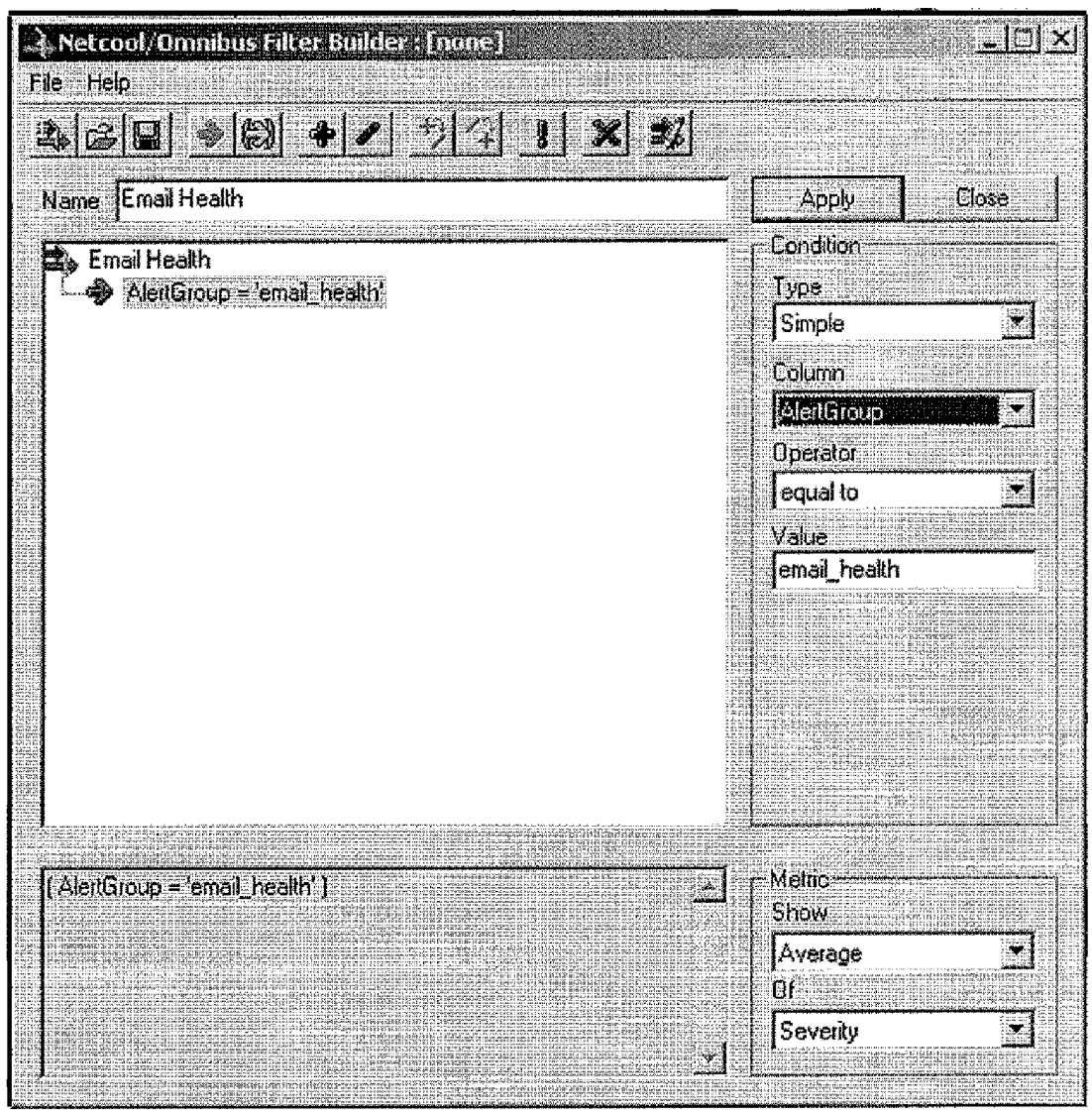
FIG. 10 depicts an exemplary page for enabling an illustrative event correlator in accordance with the principles of the present disclosure.

Referring now to FIG. 9, there are three levels of alerts in the present disclosure system. When an email fails to reach the destination within a predetermined interval, for example, 15 minutes, then a warning alert is sent to the staff in the monitoring center. If the email fails to reach the target destination a second consecutive time, a critical alert is sent. Three consecutive failures results in a fatal alert. This time along with the monitoring center, emails are sent to all the people who have subscribed to these alerts. FIG. 10 shows an exemplary alert page.

In response to critical or fatal alerts, the following steps may be taken to localize the problem:

Step 1: Execute the client verification plan specific to the server indicated by the email address experiencing failure. For example if usiverify-e2e-07-sg01-db01@clientname.tld is failing, then execute the verification plan for the server whose name ends in 07. If this test fails, the Exchange services may be down, or the database is dismounted. Each of these should be confirmed if possible and the appropriate alerts should be sent to the responsible parties.

An exemplary verification plan can require logging in to the client's web mail interface for the client mail system and sending an SMTP test message to an Internet target email account that would echo a reply back to the originating sender. This simple test verifies that web mail is working, the client mail components, i.e., databases and servers, are mounted, and that SMTP mail to the Internet can be sent out as well as that client's components can receive email.

Step 2: View the End-to-End status page for the client and determine how long the failures have been occurring. Note the address that is failing and send a test message from an Outlook® account to that address. For example, if client x is reporting a failure and the address displayed in red is Usiverify-e2e-0a-ms2@clientx.com, then send a test email to this address with a predetermined test name and numbered subject line, such as "John test #1". After one minute, check to see if the subject selected appears at one or more of the Internet target websites. For example, one could check http://www.spam.la/?f=E2Exxx and
http://www.dodgeit.com/run/
 checkmail?mailbox=E2Exxx, where the client number, xxx, is used in the web address.

Step 3: A review should also be made of the queues at the service provider and any other email service or support service programs or software, such as Exchange, IMSS®, MX Logic® or the spam filtering gateway in use by the client. If the client is experiencing more than two time periods with all or most of their addresses failing, then an alert must be generated for the email service provider team.

e. Example Detailed Method

Figure 12:
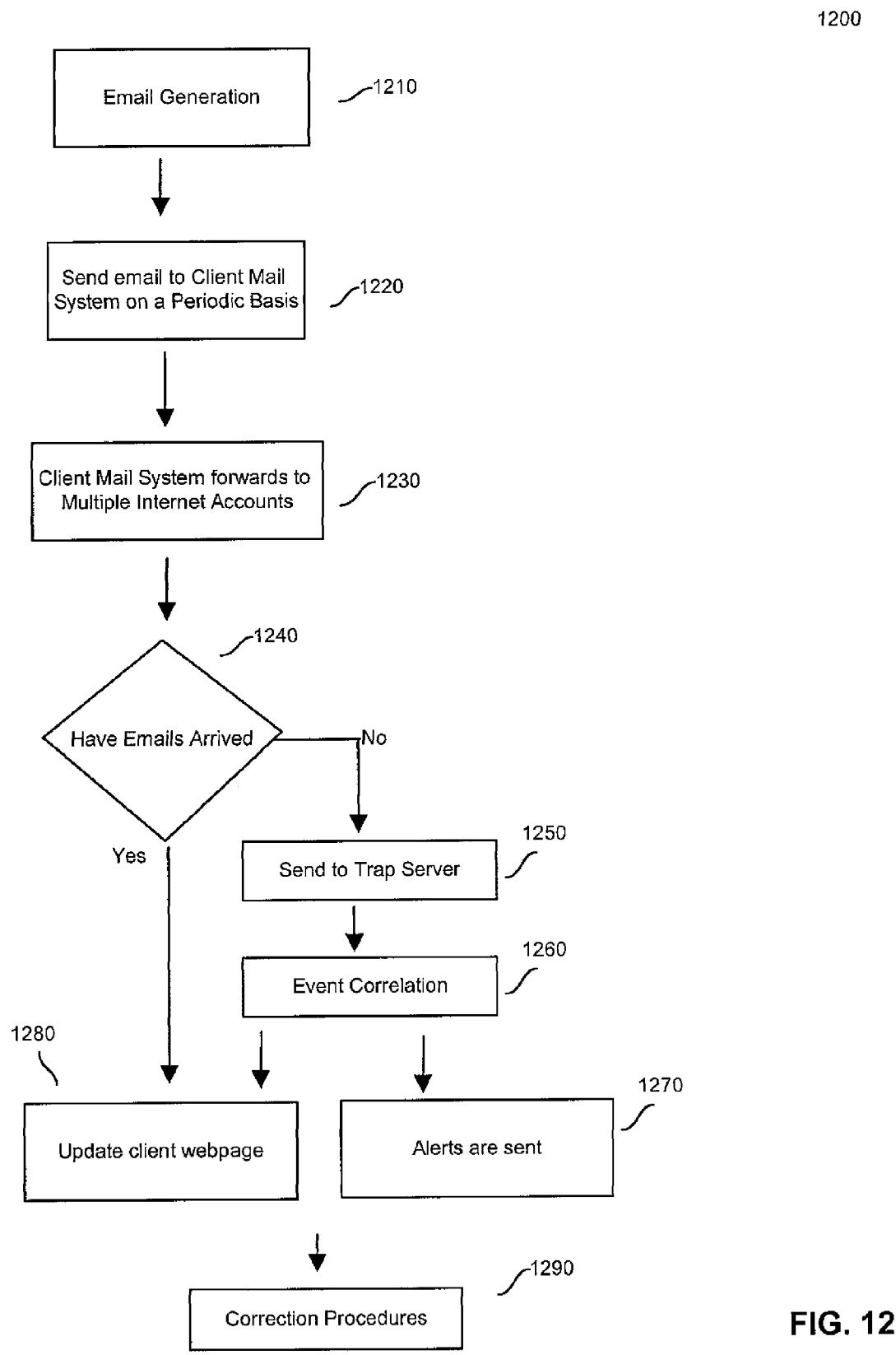
FIG. 12 illustrates a detailed method and flowchart for end to end monitoring according to the principles of the disclosure.

Referring now to flowchart 1200 in FIG. 12 and also to FIGS. 3-11, as appropriate, in step 1210 email generator 360 generates time stamped test email messages with a unique checksum for each subject line. In step 1220, the test email messages are sent through relay servers 315 and Internet 320 to dedicated client mailboxes, specifically SMTP inbound ports 382 and 388 in client mail system 330. Test email messages can be sent on a periodic basis, for example, every 15 minutes. The test email messages are automatically forwarded through client databases 384 and 390 and sent out through SMTP outbound ports 386 and 392 and via Internet 320 to Internet mail accounts 335-345 in step 1230.

Next, in step 1240, email retriever and events database 365 detects whether the test email messages have arrived at the Internet mail accounts 335-345. In step 1250, if there is a test email delivery failure, then an alert is sent to a trap server 370, which is then correlated by an event correlator 375 in step 1260. Alerts are sent to monitoring staff 350 in an operations center or to their desktops, pagers, PDAs, cellphones or any other communications device able to receive an alert and to any applicable clients in step 1270. In step 1280, interface and webpage 380 updates an email health web page for each client with the results of each test email sent. In the event of a failure, appropriate action is taken to correct any failed deliveries in step 1290.

As shown and discussed above, the monitoring system resides on a network on the Internet that is external to the client and as a result can service a large number of remote client systems without adding additional servers or program modules. Commercially, the scalability offered by the disclosure's use of an external server as opposed to a server inside each client network lends itself to easy marketability, e.g. the ability to quickly grow to service multiple clients with minimal upfront costs. Moreover, the monitoring system is easily deployed in any client environment including real, live production systems as minimal software set-up is required to implement the disclosure.

This test methodology is beneficial because it bypasses any dependency on allowing MAPI and SNMP protocols through firewalls, and tests the entire client mail system-inbound SMTP, email databases, required programs (e.g. Exchange services), and outbound Internet mail. In addition, the invention does not require the installation of specialized testing software on the client's internal server or network (as needed for MAPI) or the installation of an agent on every mail server (as needed for Sysedge®).

While the foregoing description and drawings represent example preferred embodiments of the present disclosure, it will be understood that various changes and modifications may be made without departing from the scope of the present invention.

What is claimed is:

1. A method to monitor an email system, comprising:
   sending a test email to an email server, the email server to automatically forward the test email to a plurality of email accounts of corresponding domains different from one another and different from the email system;
   when the test email does not arrive at the plurality of email accounts within a time period, generating a notification identifying the email server; and
   distinguishing other test emails from the test email based on checksum values in subject fields of the test email and the other test emails, the other test emails corresponding to different ones of a plurality of other email systems being tested for operability, and each checksum uniquely identifying a respective one of the test emails and a respective one of the email systems.

2. The method of claim 1, further comprising sending an alert to a trap server when the test email does not arrive at the plurality of email accounts.

3. The method of claim 2, further comprising correlating events stored in the trap server to update a webpage based on the non-arrival of the test email and to send the notification to monitoring personnel.

4. The method of claim 1, further comprising, when the test email does not arrive at a subset of the email accounts, determining that the email server is working and that the subset of the email accounts are unavailable.

5. The method of claim 1, wherein the notification is a warning alert associated with a first instance of the non-arrival of the test email at the email accounts, and further comprising:
   sending a critical alert to a recipient after a failure to arrive of a second test email from the email server at the email accounts within a second time period; and
   sending a fatal alert to the recipient after a failure to arrive of a third test email from the email server at the email accounts within a third time period.

6. The method of claim 1, further comprising sending the notification to a person using an out of band notification to avoid sending the notification through the email server.

7. An apparatus to monitor an email system, comprising:
   a memory having machine readable instructions stored thereon; and
   a processor to execute the instructions to perform operations comprising:
   sending a test email to an email server, the email server to automatically forward the test email to a plurality of email accounts of corresponding domains different from one another and different from the email system;
   when the test email does not arrive at the plurality of email accounts within a time period, generating a notification identifying the email server; and
   distinguishing other test emails from the test email based on checksum values in subject fields of the test email and the other test emails, the other test emails corresponding to different ones of a plurality of other email systems being tested for operability, and each checksum uniquely identifying a respective one of the test emails and a respective one of the email systems.

8. The apparatus of claim 7, wherein the processor is to execute the instructions to send an alert to a trap server when the test email does not arrive at the plurality of email accounts.

9. The apparatus of claim 8, wherein the processor is to execute the instructions to correlate events stored in the trap server to update a webpage based on the non-arrival of the test email and to send the notification to monitoring personnel.

10. The apparatus of claim 7, wherein, when the test email does not arrive at a subset of the email accounts, the processor is to execute the instructions to determine that the email server is working and that the subset of the email accounts are unavailable.

11. The apparatus of claim 7, wherein the notification is a warning alert associated with a first instance of the non-arrival of the test email at the email accounts, and wherein the operations further comprise:
   sending a critical alert to a recipient after a failure to arrive of a second test email from the email server at the email accounts within a second time period; and
   send a fatal alert to the recipient after a failure to arrive of a third test email from the email server at the email accounts within a third time period.

12. The apparatus of claim 7, wherein the operations further comprise sending the notification to a person using an out of band notification to avoid sending the notification through the email server.

13. A machine readable storage device comprising instructions which, when executed, cause a machine to perform a method comprising:
   sending a test email to an email server, the email server to automatically forward the test email to a plurality of email accounts of corresponding domains different from one another and different from the email system;
   when the test email does not arrive at the plurality of email accounts within a time period, generating a notification identifying the email server; and
   distinguishing other test emails from the test email based on checksum values in subject fields of the test email and the other test emails, the other test emails corresponding to different ones of a plurality of other email systems being tested for operability, and each checksum uniquely identifying a respective one of the test emails and a respective one of the email systems.

14. The machine readable storage device of claim 13, the method further comprising sending an alert to a trap server when the test email does not arrive at the plurality of email accounts.

15. The machine readable storage device of claim 14, the method further comprising correlating events stored in the trap server to update a webpage based on the non-arrival of the test email and to send the notification to monitoring personnel.

16. The machine readable storage device of claim 13, the method further comprising, when the test email does not arrive at a subset of the email accounts, determining that the email server is working and that the subset of the email accounts are unavailable.

17. The machine readable storage device of claim 13, wherein the notification is a warning alert associated with a first instance of the non-arrival of the test email at the email accounts, and the method further comprising:
   sending a critical alert to a recipient after a failure to arrive of a second test email from the email server at the email accounts within a second time period; and
   sending a fatal alert to the recipient after a failure to arrive of a third test email from the email server at the email accounts within a third time period.

18. The machine readable storage device of claim 13, the method further comprising sending the notification to a person using an out of band notification to avoid sending the notification through the email server.

* * * * *